(12) United States Patent
Hilty et al.

(10) Patent No.: US 11,247,434 B2
(45) Date of Patent: Feb. 15, 2022

(54) ARTICLES INCLUDING A NICKEL AND CHROMIUM LAYER AND METHODS OF FORMING THE SAME

(71) Applicant: Xtalic Corporation, Marlborough, MA (US)

(72) Inventors: Robert D. Hilty, Walpole, MA (US); Evgeniya Freydina, Ashland, MA (US); Joshua Garth Abbott, Rochester Hills, MI (US)

(73) Assignee: Xtalic Corporation, Marlborough, MA (US)

( * ) Notice: Subject to any disclaimer, the term of this patent is extended or adjusted under 35 U.S.C. 154(b) by 0 days.

(21) Appl. No.: 16/851,501

(22) Filed: Apr. 17, 2020

(65) Prior Publication Data

US 2020/0338858 A1    Oct. 29, 2020

Related U.S. Application Data

(60) Provisional application No. 62/836,519, filed on Apr. 19, 2019.

(51) Int. Cl.
*B32B 15/01* (2006.01)
*C22C 19/05* (2006.01)
*C25D 3/56* (2006.01)

(52) U.S. Cl.
CPC .......... *B32B 15/015* (2013.01); *B32B 15/012* (2013.01); *B32B 15/017* (2013.01); *C22C 19/056* (2013.01); *C25D 3/56* (2013.01)

(58) Field of Classification Search
None
See application file for complete search history.

(56) References Cited

U.S. PATENT DOCUMENTS

2017/0191179 A1*   7/2017   Sklar ................... C25D 1/02

* cited by examiner

*Primary Examiner* — Daniel J. Schleis
(74) *Attorney, Agent, or Firm* — Wolf, Greenfield & Sacks, P.C.

(57) ABSTRACT

Articles including a layer comprising nickel and chromium as well as related methods are described herein.

15 Claims, No Drawings

ARTICLES INCLUDING A NICKEL AND CHROMIUM LAYER AND METHODS OF FORMING THE SAME

RELATED APPLICATIONS

This application claims priority to U.S. Provisional Application No. 62/836,519, filed Apr. 19, 2019, which is incorporated herein by reference in its entirety.

TECHNICAL FIELD

The present invention generally relates to articles including a layer of nickel, chromium, and a third metal. Methods of electrodeposition used to produce these layers are also generally described.

BACKGROUND

Corrosion is a damaging process that occurs via when a metal is oxidized, altering the composition of the metal such that it no longer maintains the same properties of the original material. This process is typically accelerated at elevated temperatures and presents a challenge when instruments or machines containing metals must be used in applications that require high temperatures. Example of such applications include refining, petrochemical processes, power generation (e.g. fossil fuel, nuclear power), aerospace applications, gas turbines, heat treatments, chemical processing, waste incineration, and automotive processes, to name a few applications. Methods of producing metals or alloys of metals that can maintain strength and function at high temperatures remains an unsolved problem in the art.

SUMMARY

Articles including a layer comprising nickel and chromium as well as related methods are described herein.

In one aspect, an article containing an alloy of nickel, chromium, and a third metal formed as a layer on a substrate is described. The resulting alloy may have a nanocrystalline grain size. The third metal is selected from the group consisting of molybdenum, tungsten, cobalt, zinc, and rhenium.

In another aspect, an article comprising a layer formed on a substrate comprised of an alloy of nickel, chromium, and a third metal is described. The layer formed on the substrate may have a single phase. The third metal may be selected from the group consisting of molybdenum, tungsten, cobalt, zinc, and rhenium.

In another aspect, an article comprising a layer formed on a substrate comprising an alloy of nickel, chromium, and a third metal are described, such that the layer is electrodeposited and has a single phase. The third metal may be selected from the group consisting of molybdenum, tungsten, cobalt, zinc, and rhenium.

In yet another aspect, a method of electrodeposition is described. The method comprises electrodepositing a layer on a substrate, wherein the layer comprises an alloy of nickel, chromium, and a third metal selected from the group consisting of molybdenum, tungsten, cobalt, zinc, and rhenium.

Other advantages and novel features of the present invention will become apparent from the following detailed description of various non-limiting embodiments of the invention when considered in conjunction with the accompanying figures, if any. In cases where the present specification and a document incorporated by reference include conflicting and/or inconsistent disclosure, the present specification shall control.

DETAILED DESCRIPTION

Articles including a layer comprising nickel and chromium (also referred to herein as a "Ni/Cr layer") as well as related methods are described herein. In certain embodiments, the Ni/Cr layer is formed on a substrate using an electrodeposition method. In some embodiments, the Ni/Cr layer comprises an alloy of nickel, chromium, and a third metal. In some embodiments, this third metal is molybdenum. In other embodiments, the third metal may be tungsten, cobalt, zinc, or rhenium. In certain embodiments, the Ni/Cr layer comprises a ternary alloy of nickel, chromium, and a third metal, such as molybdenum.

The articles provided can offer advantages. For example, the articles (and Ni/Cr layer) may be resistant to oxidation at high temperatures, such as temperatures at least equal to or greater than 600° C. The articles may be used for a variety of purposes, such as chemical refining, petrochemical processes, power generation (e.g. fossil fuel, nuclear power), aerospace applications, gas turbines, heat treatments, chemical processing, waste incineration, and automotive processes, as non-limiting examples of applications. Any application that requires use of articles described herein at elevated temperatures (i.e., greater than or equal to 600° C.) may b appropriate. Other applications may be possible, as the disclosure is not so limited.

As noted above, the article may include a substrate on which the Ni/Cr layer is formed. A variety of different substrates may be suitable. In some cases, the substrate may comprise an electrically conductive material, such as a metal, metal alloy, intermetallic material, or the like. A non-limiting example of a suitable substrate is steel. The substrate may be in the form of a variety of shapes and dimensions. For example, the substrate may be a strip. In some cases, the substrate may be perforated. In some cases, the substrate may be a discrete component.

In some cases, the Ni/Cr layer covers substantially the entire outer surface area of the substrate. In some cases, the Ni/Cr layer only covers a portion of the outer surface area of the substrate. For example, the Ni/Cr layer may only cover one outer surface of the substrate. In some cases, portions of the substrate may be masked when forming the coating so that the Ni/Cr layer is formed selectively on certain portions of the substrate while leaving other portions of the substrate uncoated. In some embodiments, the Ni/Cr layer may be selectively deposited (e.g., using a mask) when being formed. That is, the Ni/Cr layer may cover only a portion of the outer surface area of the underlying layer or substrate.

The Ni/Cr layers described herein may vary in atomic percentage of a different species present. Some embodiments may contain an atomic percentage of nickel of at least or equal to 60%, at least or equal to 70%, or at least or equal to 75%. Certain embodiments of articles may contain an atomic percentage of nickel equal to or no more than 85%, equal to or no more than 82%, or equal to or no more than 75%.

In some embodiments, the Ni/Cr layers may contain an atomic percentage of chromium of at least or equal to 5%, at least or equal to 15%, or at least or equal to 18%. The Ni/Cr layers may contain an atomic percentage of chromium equal to or no more than 30%, equal to or no more than 25%, or equal to or no more than 15%.

In some embodiments, a third metal (e.g., molybdenum) is present in the Ni/Cr layer as noted above. For example, the third metal, in some embodiments, may contain at least 0.01% or up to 10% by atomic percentage of the third metal, while the rest of the atomic percentage is composed of nickel and/or chromium within ranges described above such that the total atomic percentage of nickel, chromium, and any other metals is 100%. In a preferred embodiment of an article, the atomic percentages of nickel, chromium, and a third metal, molybdenum, are 75%, 20%, and 5%, respectively.

Certain embodiments of the Ni/Cr layers described or methods use may have a nanocrystalline microstructure. Without wishing to be bound by theory, nanocrystalline microstructures may comprise nanoscale grains that provide improved strength and enhance the articles resistant to wear compared to articles with larger sized microstructures. These grains may be thermodynamically stable and may reduce diffusion of a metal the substrate, which reduces oxidation-based corrosion. As used herein, a "nanocrystalline" structure refers to a structure in which the number-average size of crystalline grains is less than one micron. The number-average size of the crystalline grains provides equal statistical weight to each grain and is calculated as the sum of all spherical equivalent grain diameters divided by the total number of grains in a representative volume of the body. In some embodiments, at least a portion of the Ni/Cr layer may have an amorphous structure. As known in the art, an amorphous structure is a non-crystalline structure characterized by having no long range symmetry in the atomic positions. Examples of amorphous structures include glass, or glass-like structures.

In some cases, the Ni/Cr layer may have a microstructure in which the number-average size of crystalline grains may, in some embodiments, be less than 200 nm, less than 100 nm, less than 50 nm, and/or less than 25 nm. In some embodiments, the number-average size of crystalline grains may be greater than greater than 25 nm. It should be understood that all suitable combinations of the above-noted ranges are possible.

In some cases, the Ni/Cr layer formed or deposited on the substrate has a single phase. As used herein, a "single phase" refers to a composition such that metals present are mixed homogenously as to form a solid solution. In some embodiments, the Ni/Cr layer is formed or electrodeposited such that the entire layer is in a single phase.

Certain embodiments of articles (and Ni/Cr layers) are intended to maintain structural and/or physical stability at elevated temperatures. That is, the article and Ni/Cr layers are thermally stable. These temperatures may be at least equal to or greater than 600° C., at least equal to or greater than 700° C., at least equal to or greater than 800° C., at least equal to or greater than 900° C., or at least equal to or greater than 1000° C.

In some cases, the Ni/Cr layer exhibits little or no change in grain size upon exposure to elevated temperatures for a substantial period of time. In some cases, the grain size of the Ni/Cr layer changes by no more than about 30 nm, no more than about 20 nm, no more than about 15 nm, or no more than about 10 nm following exposure to a temperature of at least 600° C. In some cases, the grain size of the Ni/Cr layer changes by no more than about 30 nm, no more than about 20 nm, no more than about 15 nm, or no more than about 10 nm following exposure to a temperature of at least 900° C. for at least 4 hours.

In some embodiments, the article may include one or more layers (e.g., metallic layers) between the substrate and the Ni/Cr layer. In some embodiments, the article may include one or more layers (e.g., metallic layers) on the Ni/Cr layer. In some embodiments, the article includes only a Ni/Cr layer formed on the substrate. In some embodiments, the Ni/Cr layer may be the uppermost layer formed on the substrate.

Furthermore, as used herein, when a layer is referred to as being "on" another layer or the substrate, it can be directly on the layer or the substrate, or an intervening layer or intervening layers may be present between the layer(s) or layer and substrate. A layer that is "directly on" another layer or substrate means that no intervening layer is present.

In certain embodiments, an oxide layer may be present on the surface of the Ni/Cr layer with the advantage of preventing oxidation of an underlying layer(s) or substrate. This oxide layer may comprise $CrO$, $Cr_2O_3$, $CrO_2$, $CrO_3$, $CrO_5$, $Cr_8O_{21}$, $NiO$, $Ni_2O_3$, $MoO_2$, $MoO_3$, or any other metal oxide formed from a metal contained within the alloy.

As noted above, the Ni/Cr layer (and any other layers present) may be formed using an electrodeposition process. Electrodeposition generally involves the deposition of a material (e.g., electroplate) on a substrate by contacting the substrate with an electrodeposition bath and flowing electrical current between two electrodes through the electrodeposition bath, i.e., due to a difference in electrical potential between the two electrodes. For example, methods described herein may involve providing an anode, a cathode, an electrodeposition bath (also known as an electrodeposition fluid) associated with (e.g., in contact with) the anode and cathode, and a power supply connected to the anode and cathode. In some cases, the power supply may be driven to generate a waveform for producing a layer.

The electrodeposition process(es) may be modulated by varying the potential that is applied between the electrodes (e.g., potential control or voltage control), or by varying the current or current density that is allowed to flow (e.g., current or current density control). In some embodiments, the layer may be formed (e.g., electrodeposited) using direct current (DC) plating, pulsed current plating, reverse pulse current plating, or combinations thereof. In some embodiments, reverse pulse plating may be preferred, for example, to form the barrier layer (e.g., nickel-tungsten alloy). Pulses, oscillations, and/or other variations in voltage, potential, current, and/or current density, may also be incorporated during the electrodeposition process, as described more fully below. For example, pulses of controlled voltage may be alternated with pulses of controlled current or current density. In general, during an electrodeposition process an electrical potential may exist on the substrate to be coated, and changes in applied voltage, current, or current density may result in changes to the electrical potential on the substrate. In some cases, the electrodeposition process may include the use waveforms comprising one or more segments, wherein each segment involves a particular set of electrodeposition conditions (e.g., current density, current duration, electrodeposition bath temperature, etc.), as described more fully below.

In some embodiments, a coating, or portion thereof, may be electrodeposited using direct current (DC) plating. For example, a substrate (e.g., electrode) may be positioned in contact with (e.g., immersed within) an electrodeposition bath comprising one or more species to be deposited on the substrate. A constant, steady electrical current may be passed through the electrodeposition bath to produce a coating, or portion thereof, on the substrate. In some embodiments, the potential that is applied between the electrodes (e.g., potential control or voltage control) and/or the current or current density that is allowed to flow (e.g., current or current density control) may be varied. For example, pulses, oscillations, and/or other variations in voltage, potential, current, and/or current density, may be incorporated during the electrodeposition process. In some embodiments, pulses of controlled voltage may be alternated with pulses of controlled current or current density. In some embodiments, the coating may be formed (e.g., electrodeposited) using pulsed current electrodeposition, reverse pulse current electrodeposition, or combinations thereof.

In some cases, a bipolar waveform may be used, comprising at least one forward pulse and at least one reverse pulse, i.e., a "reverse pulse sequence." In some embodiments, the at least one reverse pulse immediately follows the at least one forward pulse. In some embodiments, the at least one forward pulse immediately follows the at least one reverse pulse. In some cases, the bipolar waveform includes multiple forward pulses and reverse pulses. Some embodiments may include a bipolar waveform comprising multiple forward pulses and reverse pulses, each pulse having a specific current density and duration. In some cases, the use of a reverse pulse sequence may allow for modulation of composition and/or grain size of the coating that is produced.

Any suitable electrochemical baths may be used in the electrodeposition methods to deposit the Ni/Cr layer described herein. The baths may include metal salts of Ni, Cr and third element (e.g., Mo). The salts may be chlorides, bromides, sulfates, nitrates, phosphates or oxometallates. The baths may include a variety of other additives including complexing agents/ligands (e.g., citrate, tartrate, acetate, formate or oxalate); buffering agents and conducting salts (e.g., boric acid, ammonium chloride, alkali phosphates, sodium chloride, sodium bromide, aluminum sulfate), stress reducing compounds, surface tension reducing compounds/surfactants. The baths may be pH controlled to prevent in situ-formation of $Cr(OH)_x$ & $Cr(VI)$.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed.

The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

What is claimed is:

1. An article comprising:
   a substrate; and
   a layer formed on the substrate, the layer comprising an alloy of nickel, chromium, and a third metal selected from the group consisting of molybdenum, tungsten, cobalt, zinc and rhenium, wherein the alloy has a nanocrystalline grain size and wherein the layer has a single-phase.

2. A method comprising:
   electrodepositing a layer on a substrate, wherein the layer comprises an alloy of nickel, chromium, and a third metal selected from the group consisting of molybdenum, tungsten, cobalt, zinc and rhenium, wherein the alloy has a nanocrystalline grain size and wherein the layer has a single-phase.

3. The article claim 1, wherein an atomic percentage of nickel is between or equal to 60% and 85%.

4. The article claim 1, wherein an atomic percentage of chromium is between or equal to 15% and 30%.

5. The article claim 1, wherein an atomic percentage of the third metal is between 0% and 10%.

6. The article claim 1, wherein an atomic percentage of nickel, chromium, and the third metal present in the alloy sums to 100%.

7. The article claim 1, wherein chromium oxide is present at the surface of the layer.

8. The article claim 1, wherein the article comprises an additional layer formed on the substrate.

9. The article claim 1, wherein the layer comprises a ternary alloy of nickel, chromium, and the third metal.

10. The article claim 1, wherein the layer comprises a ternary alloy of nickel, chromium, and molybdenum.

11. The article of claim 1, wherein the article includes no additional layers.

12. The article of claim 1, wherein the article includes only one additional layer.

13. The article of claim 12, wherein the one additional layer is formed between the substrate and the layer comprising the alloy of nickel, chromium, and a third metal.

14. The article of claim 13, wherein the one additional layer is formed on the layer comprising the alloy of nickel, chromium, and a third metal.

15. The article of claim 1, wherein the article includes only two additional layers, wherein one of the additional layers is formed between the substrate and the layer comprising the alloy of nickel, chromium, and a third metal and one of the additional layers is formed on the layer comprising the alloy of nickel, chromium, and a third metal.

* * * * *